(12) United States Patent
Onoe et al.

(10) Patent No.: US 10,183,253 B2
(45) Date of Patent: Jan. 22, 2019

(54) EXHAUST GAS PURIFICATION DEVICE

(71) Applicant: CATALER CORPORATION, Kakegawa-shi, Shizuoka (JP)

(72) Inventors: Ryota Onoe, Kakegawa (JP); Shingo Sakagami, Kakegawa (JP); Tsuyoshi Ito, Kakegawa (JP); Tatsuya Ohashi, Kakegawa (JP); Naoto Miyoshi, Toyota (JP); Masahiko Takeuchi, Toyota (JP); Akemi Sato, Toyota (JP)

(73) Assignee: CATALER CORPORATION, Kakegawa (JP)

( * ) Notice: Subject to any disclaimer, the term of this patent is extended or adjusted under 35 U.S.C. 154(b) by 129 days.

(21) Appl. No.: 15/517,978

(22) PCT Filed: Oct. 6, 2015

(86) PCT No.: PCT/JP2015/078409
§ 371 (c)(1),
(2) Date: Apr. 10, 2017

(87) PCT Pub. No.: WO2016/060030
PCT Pub. Date: Apr. 21, 2016

(65) Prior Publication Data
US 2017/0304772 A1    Oct. 26, 2017

(30) Foreign Application Priority Data

Oct. 17, 2014  (JP) .................................. 2014-213111

(51) Int. Cl.
*B01D 53/94* (2006.01)
*B01J 23/63* (2006.01)
(Continued)

(52) U.S. Cl.
CPC ............ *B01D 53/94* (2013.01); *B01D 53/945* (2013.01); *B01J 23/42* (2013.01); *B01J 23/44* (2013.01);
(Continued)

(58) Field of Classification Search
CPC .................. B01D 53/94; B01D 53/945; B01D 2255/1021; B01D 2255/1025;
(Continued)

(56) References Cited

U.S. PATENT DOCUMENTS

2008/0070776 A1\* 3/2008 Yamaguchi ........ B01D 46/2429
502/100
2009/0087365 A1  4/2009 Klingmann et al.
2012/0244042 A1\* 9/2012 Mizutani ............ B01D 46/2429
422/180

FOREIGN PATENT DOCUMENTS

JP    2007-185571 A    7/2007
JP    2009-082915 A    4/2009
(Continued)

OTHER PUBLICATIONS

Nov. 24, 2015 International Search Report issued in International Patent Application No. PCT/JP2015/078409.

*Primary Examiner* — Phutthiwat Wongwian
*Assistant Examiner* — Kelsey Stanek
(74) *Attorney, Agent, or Firm* — Oliff PLC

(57) ABSTRACT

The exhaust gas purification device is provided with a wall flow structure substrate that has an entry-side cell, an exit-side cell and a porous partition, first catalyst parts which are formed in small pores having a relatively small pore diameter among internal pores in the partition, and second catalyst parts which are formed in large pores having a relatively large pore diameter among the internal pores in the partition. The first catalyst parts and the second catalyst parts each contain a carrier and at least one type of noble metal (Continued)

from among Pt, Pd and Rh supported on the carrier. The noble metal content in the first catalyst parts is smaller than the noble metal content in the second catalyst parts per 1 liter of substrate volume.

4 Claims, 8 Drawing Sheets

(51) Int. Cl.
- $B01J\ 35/04$ (2006.01)
- $B01J\ 35/00$ (2006.01)
- $F01N\ 3/035$ (2006.01)
- $B01J\ 23/42$ (2006.01)
- $B01J\ 23/44$ (2006.01)
- $B01J\ 23/46$ (2006.01)
- $F01N\ 3/28$ (2006.01)

(52) U.S. Cl.
CPC ............ *B01J 23/462* (2013.01); *B01J 23/63* (2013.01); *B01J 35/0006* (2013.01); *B01J 35/04* (2013.01); *F01N 3/035* (2013.01); *F01N 3/2828* (2013.01); *B01D 2255/1021* (2013.01); *B01D 2255/1025* (2013.01); *B01D 2255/407* (2013.01); *B01D 2255/9155* (2013.01); *B01D 2255/9202* (2013.01); *B01D 2258/014* (2013.01); *F01N 2510/068* (2013.01); *Y02T 10/22* (2013.01)

(58) Field of Classification Search
CPC ...... B01D 2255/407; B01D 2255/9155; B01D 2255/9202; B01D 2258/014; B01J 23/42; B01J 23/44; B01J 23/462; B01J 23/63; B01J 23/46; B01J 23/10; B01J 35/0006; B01J 35/04; F01N 3/035; F01N 3/2828; F01N 3/2066; F01N 2510/068; Y02T 10/22
USPC .................................. 60/302; 422/177, 180
See application file for complete search history.

(56) References Cited

FOREIGN PATENT DOCUMENTS

| | | |
|---|---|---|
| JP | 2012-196656 A | 10/2012 |
| WO | 2007/094379 A1 | 8/2007 |

\* cited by examiner

EXHAUST GAS PURIFICATION DEVICE

TECHNICAL FIELD

The present invention relates to an exhaust gas purification device. More specifically, the present invention relates to an exhaust gas purification device that purifies exhaust gases emitted by an internal combustion engine such as a gasoline engine.

Note that the present international application claims priority on the basis of Japanese Patent Application No. 2014-213111, filed on 17 Oct. 2014, the entire content of which is incorporated by reference in the present specification.

BACKGROUND ART

Exhaust gases emitted by internal combustion engines generally contain particulate matter (PM) containing mainly carbon, and ash containing non-combustible components, and the like and these are known to be a cause of atmospheric pollution. In this regard, regulations have been tightened year by year for emissions of particulate matter in addition to components contained in exhaust gases, such as hydrocarbons (HC), carbon monoxide (CO) and nitrogen oxides (NOx). Because of this techniques have been proposed for trapping and removing such particulate matter from exhaust gases.

For example, a particulate filter for trapping this type of particulate matter can be provided in the exhaust pathway of an internal combustion engine. For example, because gasoline engines emit certain amounts of particulate matter, although less than diesel engines, together with exhaust gases, a gasoline particulate filter (GPF) is, in some cases, installed in the exhaust pathway. A filter in which a substrate is constituted from a multiplicity of cells made up of a porous material and the entry and exit of the multiplicity of cells are alternately blocked, which is a structure known as a wall flow structure, is known as this type of particulate filter (see Patent Literature 1 and 2). In a particulate filter having a wall flow structure, exhaust gas flowing in from the entry of a cell passes through a porous cell partition that divides the cells, and is discharged to a cell exit. Then, while the exhaust gas passes through the porous cell partition, particulate matter is trapped in pores inside the partition.

CITATION LIST

Patent Literature

Patent Literature 1: Japanese Patent Application Publication No. 2009-82915
Patent Literature 2: Japanese Patent Application Publication No. 2007-185571

SUMMARY OF INVENTION

Here, investigations have been carried out in recent years into supporting noble metal catalysts on particulate filters in order to further improve purification performance. For example, Patent Literature 1 discloses a filter catalyst in which a palladium (Pd) layer is disposed as a noble metal catalyst inside a partition and a rhodium (Rh) layer is laminated on the surface of the partition. In addition, Patent Literature 2 discloses a filter catalyst in which a platinum (Pt) layer and a rhodium (Rh) layer as noble metal catalysts are supported separately inside a partition.

However, because the Rh layer is formed on the surface of a partition in the invention disclosed in Patent Literature 1, exhaust gas flow resistance increases and pressure losses increase. This leads to concerns that engine output will decrease. In addition, because the Pt layer and the Rh layer are supported separately inside a partition in the invention disclosed in Patent Literature 2, an increase in pressure losses can be suppressed, but because exhaust gases first come into contact with the Rh layer, the Rh readily degrades. This leads to concerns that purification efficiency will deteriorate. In addition, the efficiency of use of the Rh and Pt is poor and large quantities of Rh and Pt are required, meaning that production costs increase. In recent years, there have been demands to reduce usage quantities of Rh and Pt, which are expensive and valuable, as far as possible in order to reduce costs and the like.

The present invention has been developed with these circumstances in mind and has the primary objective of providing an exhaust gas purification device provided with a wall flow structure type filter catalyst in which the usage quantity of noble metals can be reduced while improving exhaust gas purification performance.

Solution to Problem

The exhaust gas purification device according to the present invention is an exhaust gas purification device which is disposed in an exhaust pathway of an internal combustion engine and which purifies exhaust gases emitted by the internal combustion engine. This device is provided with a wall flow structure substrate that has an entry-side cell in which only the exhaust gas inlet side end is open, an exit-side cell which is adjacent to the entry-side cell and in which only the exhaust gas outlet side end is open, and a porous partition which divides the entry-side cell from the exit-side cell, first catalyst parts which are formed in small pores having a relatively small pore diameter among internal pores in the partition, and second catalyst parts which are formed in large pores having a relatively large pore diameter among the internal pores in the partition. The first catalyst parts and the second catalyst parts each contain a carrier and at least one type of noble metal from among Pt, Pd and Rh supported on the carrier. In addition, the noble metal content in the first catalyst parts is smaller than the noble metal content in the second catalyst parts per 1 liter of substrate volume.

The noble metal content in the small pores (first catalyst parts) is smaller than the noble metal content in the large pores (second catalyst parts) inside the partitions in the exhaust gas purification device. According to findings by the inventors of the present invention, because the small pores having relatively small pore diameters form intricately complicated pathways in partitions (indirect pathways that do not pass directly through partitions), exhaust gases tend to reside for a longer period of time. As a result, exhaust gases are purified more efficiently in the first catalyst parts in which small pores are formed even if the quantity of noble metal is small. Meanwhile, because the large pores having relatively large pore diameters are connected in the partition thickness direction by independent pores or pore linkages, exhaust gases tend to pass smoothly through the partitions. As a result, exhaust gases are rapidly purified in the second catalyst parts in which large pores are formed, without causing an increase in pressure losses.

According to the constitution of the present invention, the noble metal content in the small pores (first catalyst parts), in which catalytic activity is high even if the quantity of noble metal is small, is smaller than the noble metal content in the large pores (second catalyst parts). By providing a suitable difference in noble metal content between the small pores (first catalyst parts) and large pores (second catalyst parts) and appropriately adjusting the catalytic activity in both catalyst parts in this way, it is possible to reduce the usage quantity of noble metals in the filter as a whole and effectively improve exhaust gas purification performance. Therefore, according to the present invention, it is possible to provide a high performance exhaust gas purification device which exhibits excellent purification performance at low cost.

In a preferred aspect of the exhaust gas purification device disclosed here, the supported quantity of noble metal per 1 g of carrier in the first catalyst parts is smaller than the supported quantity of noble metal per 1 g of carrier in the second catalyst parts. By providing a difference in supported quantity of noble metal in this way, it is possible to obtain an optimal exhaust gas purification device which achieves both a reduction in noble metal usage quantity and an improvement in purification performance to a higher degree.

In a preferred aspect of the exhaust gas purification device disclosed here, the average pore diameter of small pores in which the first catalyst parts are formed is not more than 10 μm, and the average pore diameter of large pores in which the second catalyst parts are formed is more than 10 μm and not more than 100 μm. By supporting noble metals in small pores and large pores having such pore diameters, exhaust gases passing through partitions can be purified more efficiently.

In a preferred aspect of the exhaust gas purification device disclosed here, the first catalyst parts and the second catalyst parts contain Pt and Rh as the noble metals. According to such a constitution, harmful components in exhaust gases can be efficiently eliminated all at once, and exhaust gas purification performance can be further improved.

In a preferred aspect of the exhaust gas purification device disclosed here, the internal combustion engine is a gasoline engine. In a gasoline engine, the exhaust gas temperature is relatively high and PM hardly builds up inside partitions. As a result, the effects mentioned above can be more effectively achieved in cases where the internal combustion engine is a gasoline engine.

DESCRIPTION OF EMBODIMENTS

Based on the drawings, explanations will now be given of preferred embodiments of the present invention. Moreover, matters which are essential for carrying out the invention (for example, ordinary matters such as those relating to the arrangement of a particulate filter in a motor vehicle) and which are matters other than those explicitly mentioned in this specification are matters that a person skilled in the art could understand to be matters of design on the basis of the prior art in this technical field. The present invention can be carried out on the basis of the matters disclosed in the present specification and common general technical knowledge in this technical field.

First Embodiment

Figure 1:
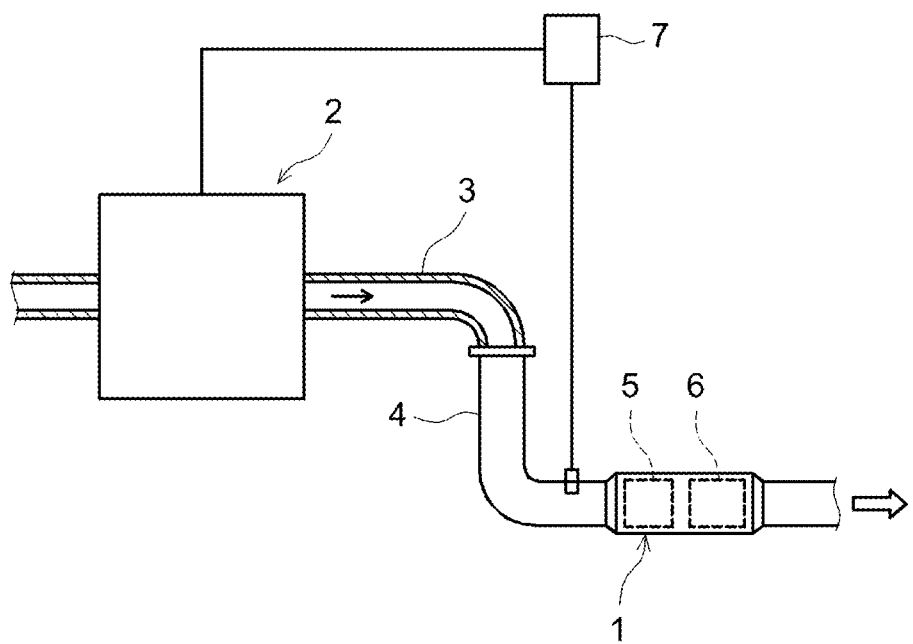
FIG. 1 is a diagram that schematically illustrates an exhaust gas purification device according to one embodiment.

First, with reference to FIG. 1, an explanation will be given of the constitution of an exhaust gas purification device according to one embodiment of the present invention. The exhaust gas purification device 1 disclosed here is provided in the exhaust system of the internal combustion engine. FIG. 1 is a diagram that schematically illustrates an internal combustion engine 2 and the exhaust gas purification device 1 provided in the exhaust system of the internal combustion engine 2.

A mixed gas containing oxygen and a fuel gas is supplied to the internal combustion engine (engine) according to the present embodiment. The internal combustion engine combusts this mixed gas and converts combustion energy into mechanical energy. The combusted mixed gas is converted into exhaust gas and is discharged into the exhaust system. The internal combustion engine 2 having the constitution shown in FIG. 1 is constituted mainly from a motor vehicle gasoline engine.

An explanation will now be given of the exhaust system of the engine 2. An exhaust manifold 3 is connected to an exhaust port (not shown) that connects the engine 2 to the exhaust system. The exhaust manifold 3 is connected to an exhaust pipe 4 through which the exhaust gas flows. The exhaust pathway of the present embodiment is formed from the exhaust manifold 3 and the exhaust pipe 4. The arrows in the diagram show the direction of flow of the exhaust gas.

The exhaust gas purification device 1 disclosed here is provided in the exhaust system of the engine 2. This exhaust gas purification device 1 is provided with a catalyst part 5, a filter part 6 and an ECU 7, eliminates harmful components contained in the emitted exhaust gas (for example, carbon monoxide (CO), hydrocarbons (HC) and nitrogen oxides ($NO_x$)), and traps particulate matter (PM) contained in the exhaust gas.

The catalyst part 5 is constituted so as to be able to eliminate three components contained in the exhaust gas (NOx, HC and CO), and is provided in the exhaust pipe 4 connected to the engine 2. More specifically, the catalyst part 5 is provided on the downstream side of the exhaust pipe 4, as shown in FIG. 1. The type of catalyst part 5 is not particularly limited. The catalyst part 5 may be a catalyst on which is supported, for example, a noble metal such as platinum (Pt), palladium (Pd) or rhodium (Rh). Moreover, a downstream side catalyst part may further be provided downstream of the filter part 6 in the exhaust pipe 4. Because the specific constitution of the catalyst part 5 does not characterize the present invention, a detailed explanation is omitted here.

The filter part 6 is provided on the downstream side of the catalyst part 5. The filter part 6 is provided with a gasoline particulate filter (GPF) capable of trapping and eliminating particulate matter (hereinafter referred to simply as "PM") contained in the exhaust gas. A detailed explanation will now be given of the particulate filter according to the present embodiment.

Figure 2:
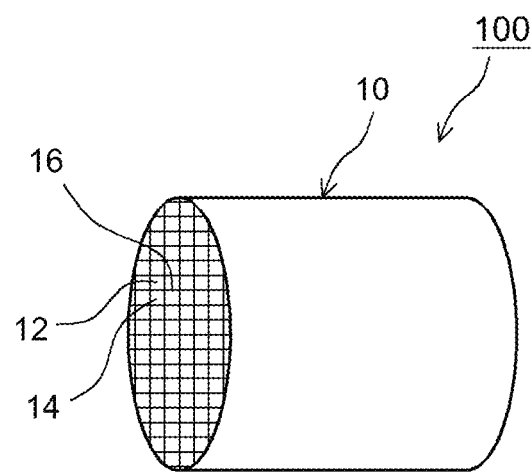
FIG. 2 is a perspective view that schematically illustrates a filter of an exhaust gas purification device according to one embodiment.
Figure 3:
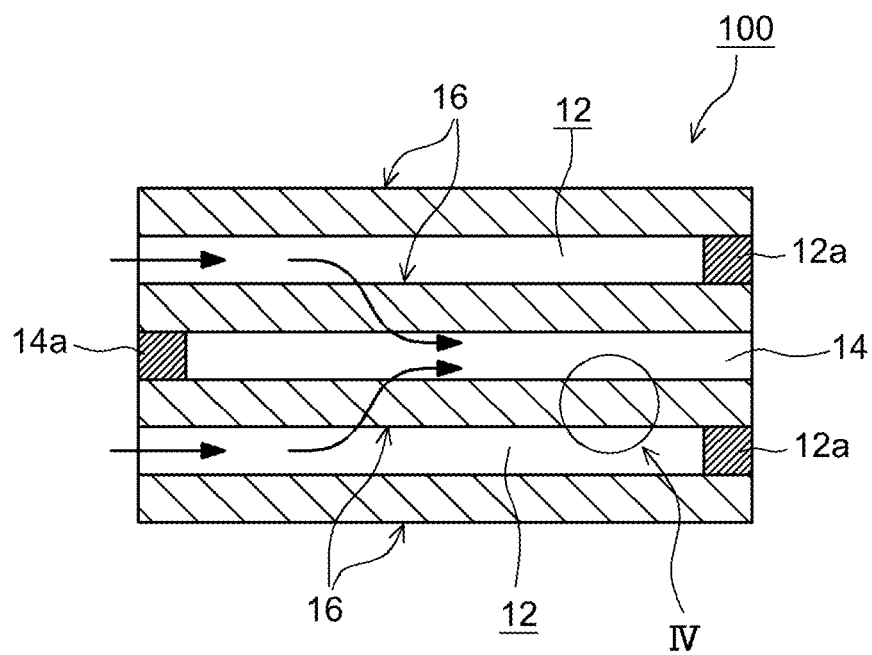
FIG. 3 is a cross-sectional view that schematically illustrates a cross section of a filter of an exhaust gas purification device according to one embodiment.

FIG. 2 is a perspective view of a particulate filter 100. FIG. 3 is a schematic view obtained by enlarging a part of a cross section obtained by cutting the particulate filter 100 in the axial direction. As shown in FIG. 2 and FIG. 3, the particulate filter 100 is provided with a substrate 10 having a wall flow structure, first catalyst parts 20 (see FIG. 4) and second catalyst parts 30 (see FIG. 4). Explanations will now be given in order of the substrate 10, the first catalyst parts 20 and the second catalyst parts 30.

<Substrate 10>

For the substrate 10, it is possible to use a variety of conventional materials and forms used in such applications. For example, a substrate formed from a ceramic such as cordierite or silicon carbide (SiC) or an alloy (stainless steel or the like) can be advantageously used. One example is a substrate having a round cylindrical outer shape (the present embodiment). However, the outer shape of the substrate as a whole may be an elliptic cylinder or a polygonal cylinder instead of a round cylinder. This substrate 10 has an entry-side cell 12 in which only the exhaust gas inlet side end is open, an exit-side cell 14 which is adjacent to the entry-side cell 12 and in which only the exhaust gas outlet side end is open, and a porous partition 16 which divides the entry-side cell 12 from the exit-side cell 14.

<Entry-side Cell 12 and Exit-side Cell 14>

In the entry-side cell 12, only the exhaust gas inlet side end is open, and in the exit-side cell 14, which is adjacent to the entry-side cell 12, only the exhaust gas outlet side end is open. In this embodiment, the exhaust gas outlet side end of the entry-side cell 12 is sealed by a sealing part 12*a*, and the exhaust gas inlet side end of the exit-side cell 14 is sealed by a sealing part 14*a*. The shape and size of the entry-side cell 12 and the exit-side cell 14 should be set as appropriate in view of the flow rate of, and components contained in, the exhaust gas supplied to the filter 100. For example, the shape of the entry-side cell 12 and the exit-side cell 14 may be a variety of geometric shapes, such as a rectangular shape such as a square, a parallelogram, a rectangle or a trapezium; a triangle; another polygon (for example, a hexagon or octagon); or a circle.

<Partition 16>

A partition 16 is formed between an entry-side cell 12 and an adjacent exit-side cell 14. The entry-side cell 12 and the exit-side cell 14 are divided by this partition 16. The partition 16 has a porous structure through which the exhaust gas can pass. The porosity of the partition 16 is not particularly limited, but a porosity of approximately 50% to 70% is suitable, with a porosity of 55% to 65% being preferred. If the porosity of the partition 16 is too low, pressure losses may increase, but if the porosity of the partition 16 is too high, the mechanical strength of the filter 100 tends to deteriorate, which is not desirable. The thickness of the partition 16 is not particularly limited, but should generally be approximately 200 µm to 800 µm. If the thickness of the partition falls within this range, it is possible to achieve the effect of suppressing an increase in pressure losses without causing the PM trapping efficiency to deteriorate.

Figure 4:
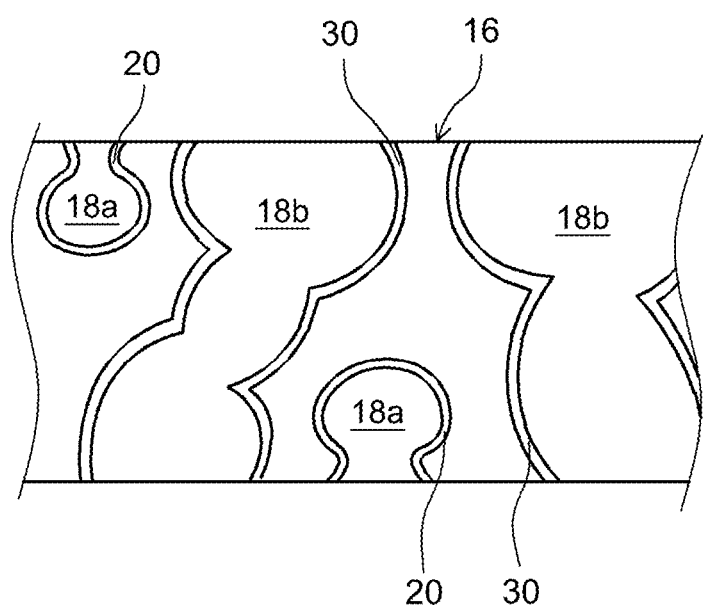
FIG. 4 is a cross-sectional schematic view in which region IV in FIG. 3 is enlarged.

FIG. 4 is an expanded schematic view obtained by enlarging region IV shown in FIG. 3. As shown in FIG. 4, the partition 16 has small pores 18*a* having relatively small pore diameters and large pores 18*b* having a relatively large pore diameter. In this embodiment, the partition 16 is constituted in such a way that the front surface and back surface of the partition 16 can be connected by independent large pores 18*b* (or a multiplicity of large pore 18*b* linkages). In addition, in the partition 16, intricately complicated pathways (indirect pathways that do not pass directly through partitions) are formed by the small pores 18*a* (which typically do not pass through the partition 16), which are smaller than the large pores 18*b*. The first catalyst parts 20 are formed inside the small pores 18*a*, and the second catalyst parts 30 are formed inside the large pores 18*b*.

<First Catalyst Parts>

The first catalyst parts 20 are formed on wall surfaces of the small pores 18*a* among the internal pores 18*a* and 18*b* in the partition 16. The small pores 18*a* having relatively small pore diameters form intricately complicated pathways in partitions 16, and therefore exhaust gases tend to reside for a longer period of time. As a result, exhaust gases can be efficiently purified by the first catalyst parts 20 formed in the small pores 18*a* even if the quantity of noble metal is small. The pore diameter of the small pores 18*a* in which the first catalyst parts 20 are formed should be smaller than pore diameter of the large pores 18*b* in which the second catalyst parts 30 are formed. For example, the average pore diameter, as determined using a gas adsorption method or by means of scanning electron microscope (SEM) images, of the small pores 18*a* in which the first catalyst parts 20 are formed is preferably approximately 10 µm or less (for example, 0.1 µm to 10 µm), more preferably 8 µm or less, and particularly preferably 5 µm or less. If the pore diameter of the small pores 18*a* falls within this range, exhaust gases can be efficiently purified by the first catalyst parts 20 formed in the small pores 18*a*. Harmful components eliminated by the first catalyst parts 20 are not particularly limited, but examples thereof include HC, CO and NOx.

<Second Catalyst Parts 30>

The second catalyst parts 30 are formed on wall surfaces of the large pores 18*b* among the internal pores 18*a* and 18*b* in the partition 16. Because the large pores 18*b* having relatively large pore diameters are connected in the thickness direction of the partition 16 by independent large pores 18*b* or large pore 18*b* linkages, the exhaust gas tends to pass smoothly through the partition. As a result, the exhaust gas can be rapidly purified by the second catalyst parts 30 formed in the large pores 18*b* without causing an increase in pressure losses. The pore diameter of the large pores 18*b* in which the second catalyst parts 30 are formed should be larger than the pore diameter of the small pores 18*a* in which the first catalyst parts 20 are formed. For example, the average pore diameter, as determined using a gas adsorption method or by means of scanning electron microscope (SEM)

images, of the large pores 18b in which the second catalyst parts 30 are formed is preferably more than approximately 10 μm (for example, more than 10 μm and not more than 100 μm), more preferably 15 μm or more, and particularly preferably 20 μm or more. If the pore diameter of the large pores 18b falls within this range, exhaust gases can be rapidly purified by the second catalyst parts 30 formed in the large pores 18b. Harmful components eliminated by the second catalyst parts 30 are not particularly limited, but examples thereof include HC, CO and NOx.

<Noble Metals>

The first catalyst parts 20 and the second catalyst parts 30 are provided with a carrier (not shown in the diagrams) and a noble metal (not shown in the diagrams) supported on the carrier. The first catalyst parts 20 and the second catalyst parts 30 should contain at least one type of noble metal from among platinum (Pt), palladium (Pd) and rhodium (Rh).

Here, the noble metal content in the first catalyst parts 20 is smaller than the noble metal content in the second catalyst parts 30 per 1 liter of substrate volume. In this embodiment, the formed quantity (coated quantity) of the first catalyst parts 20 is equivalent to the formed quantity (coated quantity) of the second catalyst parts 30 per 1 liter of substrate volume, and the supported quantity of noble metal per 1 g of carrier in the first catalyst parts 20 is smaller than the supported quantity of noble metal per 1 g of carrier in the second catalyst parts 30. That is, the supported quantity of noble metal per 1 g of carrier in the first catalyst parts 20 is smaller than the supported quantity of noble metal per 1 g of carrier in the second catalyst parts 30, while the formed quantity of the first catalyst parts 20 is equivalent to the formed quantity of the second catalyst parts 30 per 1 liter of substrate volume.

The supported quantity of noble metal per 1 g of carrier in the first catalyst parts 20 should be smaller than the supported quantity of noble metal per 1 g of carrier in the second catalyst parts 30. For example, the ratio (W1/W2) of supported quantity W1 of noble metal per 1 g of carrier in the first catalyst parts 20 to supported quantity W2 of noble metal per 1 g of carrier in the second catalyst parts 30 should be approximately 0.6 or lower, preferably 0.5 or lower, and particularly preferably 0.3 or lower.

In the exhaust gas purification device disclosed here, the supported quantity of noble metal in the small pores 18a (first catalyst parts 20), which exhibit high catalytic activity even if the quantity of noble metal is small, is lower than the supported quantity of noble metal in the small pores 18b (second catalyst parts 30). By providing a suitable difference in noble metal content between the small pores 18a and large pores 18b and appropriately adjusting the catalytic activity in both catalyst parts in this way, it is possible to reduce the usage quantity of noble metals in the filter as a whole while effectively improving exhaust gas purification performance. Therefore, according to the present constitution, it is possible to provide a high performance exhaust gas purification device which exhibits excellent purification performance at low cost.

In the exhaust gas purification device disclosed here, the supported quantity ratio (W1/W2) preferably satisfies the formula (W1/W2) 0.6, more preferably satisfies the formula (W1/W2) 0.4, and particularly preferably satisfies the formula (W1/W2) 0.3. Meanwhile, if the supported quantity ratio (W1/W2) is lower than 0.1, the catalytic activity of the first catalyst parts 20 becomes too low, meaning that the desired purification performance may not be achieved. From the perspective of improving purification performance, it is preferable to satisfy the formula 0.1 (W1/W2) (and especially 0.15 (W1/W2)). For example, first catalyst parts 20 and second catalyst parts 30 for which the supported quantity ratio (W1/W2) is 0.1 to 0.5 (and especially 0.15 to 0.25) are suitable from the perspective of achieving both an increase in purification performance and a reduction in costs.

In this embodiment, the first catalyst parts 20 and the second catalyst parts 30 contain Pt and Rh as noble metals. The supported quantity of Pt per 1 g of carrier in the first catalyst parts 20 should be approximately 0.001 g to 0.01 g, preferably 0.002 g to 0.008 g, and particularly preferably 0.003 g to 0.005 g. The supported quantity of Pt per 1 g of carrier in the second catalyst parts 30 should be approximately 0.005 g to 0.05 g, preferably 0.010 g to 0.04 g, and particularly preferably 0.015 g to 0.025 g. The supported quantity of Rh per 1 g of carrier in the first catalyst parts 20 should be approximately 0.0005 g to 0.005 g, preferably 0.0008 g to 0.004 g, and particularly preferably 0.001 g to 0.003 g. The supported quantity of Rh per 1 g of carrier in the second catalyst parts 30 should be approximately 0.0025 g to 0.025 g, preferably 0.004 g to 0.02 g, and particularly preferably 0.005 g to 0.015 g. Moreover, noble metals other than Rh, Pt and Pd may be contained in the first catalyst parts 20 and the second catalyst parts 30. Ruthenium (Ru), iridium (Ir), osmium (Os), and the like, may be used as noble metals other than Rh, Pt and Pd.

The first catalyst parts 20 and the second catalyst parts 30 are formed by supporting Pt and Rh on a carrier. Examples of Pt carriers on which Pt is supported include metal oxides such as alumina ($Al_2O_3$), zirconia ($ZrO_2$), ceria ($CeO_2$), silica ($SiO_2$), magnesia (MgO) and titanium oxide (titania: $TiO_2$), and solid solutions of these oxides (for example ceria-zirconia ($CeO_2$—$ZrO_2$) composite oxides). Of these, ceria-zirconia composite oxides are preferred. It is possible to use a combination of two or more types of these carriers. Moreover, it is possible to add other materials (typically inorganic oxides) as secondary components to the Pt carrier. Rare earth elements such as lanthanum (La) and yttrium (Y), alkaline earth elements such as calcium, other transition metal elements, and the like, can be used as substances able to be added to the Pt carrier. Of these, rare earth elements such as lanthanum and yttrium can be advantageously used as stabilizers in order to improve the specific surface area at high temperatures without impairing catalyst function.

The method for supporting Pt on the Pt carrier is not particularly limited. For example, the carrier can be prepared by immersing the Pt carrier in an aqueous solution containing a Pt salt (for example, a nitrate) or a Pt complex (for example, a dinitrodiamine complex), and then drying and firing the carrier.

Examples of Rh carriers on which Rh is supported include metal oxides such as alumina ($Al_2O_3$), zirconia ($ZrO_2$), ceria ($CeO_2$), silica ($SiO_2$), magnesia (MgO) and titanium oxide (titania: $TiO_2$), and solid solutions of these oxides (for example ceria-zirconia ($CeO_2$—$ZrO_2$) composite oxides). Of these, alumina is preferred. It is possible to use a combination of two or more types of these carriers. Moreover, it is possible to add other materials (typically inorganic oxides) as secondary components to the Rh carrier. Rare earth elements such as lanthanum (La) and yttrium (Y), alkaline earth elements such as calcium, other transition metal elements, and the like, can be used as substances able to be added to the Rh carrier. Of these, rare earth elements such as lanthanum and yttrium can be advantageously used as stabilizers in order to improve the specific surface area at high temperatures without impairing catalyst function.

The method for supporting Rh on the Rh carrier is not particularly limited. For example, the carrier can be prepared by immersing the Rh carrier in an aqueous solution containing a Rh salt (for example, a nitrate) or a Rh complex (for example, a tetraammine complex), and then drying and firing the carrier.

In addition to the noble metals mentioned above (Pt and Rh in this case) and the carrier (the Pt carrier and Rh carrier in this case), the first catalyst parts 20 and the second catalyst parts 30 may contain a NOx storage material having NOx storage capacity. The NOx storage material should have NOx storage capacity which stores NOx in exhaust gases when the air/fuel ratio in the exhaust gas is in an oxygen-rich lean state and releases stored NOx when the air/fuel ratio switches to the rich side. Basic materials containing one or two or more metals able to donate electrons to NOx can be advantageously used as the NOx storage material. Examples thereof include alkali metals such as potassium (K), sodium (Na) and cesium (Cs), alkaline earth metals such as barium (Ba) and calcium (Ca), rare earth elements such as lanthanoids, and metals such as silver (Ag), copper (Cu), iron (Fe) and iridium (Ir). Of these, barium compounds (for example, barium sulfate) exhibit high NOx storage capacity and are preferred as NOx storage materials used in the exhaust gas purification device disclosed here.

In addition, the first catalyst parts 20 and the second catalyst parts 30 may contain an OSC (oxygen storage capacity) material having oxygen storage capacity. This OSC material should store oxygen present in an exhaust gas when the air/fuel ratio in the exhaust gas is lean (that is, an atmosphere on the oxygen-excess side) and release stored oxygen when the air/fuel ratio in the exhaust gas is rich (that is, an atmosphere on the fuel-excess side). Examples of the OSC material include cerium oxide (ceria: $CeO_2$) and ceria-containing complex oxides (for example, ceria-zirconia complex oxides ($CeO_2$—$ZrO_2$ complex oxides)). Of these, $CeO_2$—$ZrO_2$ composite oxides exhibit high oxygen storage capacity and are preferred as OSC materials used in the exhaust gas purification device disclosed here.

Although not particularly limited, in cases in which the first catalyst parts 20 and the second catalyst parts 30 contain catalyst part-forming components other than the noble metals and carriers (for example, NOx storage materials, OSC materials, or binders such as those mentioned later), the total content of these optional components is preferably approximately 10 mass % or less, and more preferably approximately 8 mass % or less (for example, approximately 1 to 5 mass %).

<Methods for Forming First Catalyst Parts 20 and Second Catalyst Parts 30>

When the first catalyst parts 20 and the second catalyst parts 30 are formed, the first catalyst parts 20 and the second catalyst parts 30 should be formed from different slurries. For example, a first slurry for forming the first catalyst parts 20 and a second slurry for forming the second catalyst parts 30 should be prepared.

The first slurry contains a powder obtained by supporting Pt on the Pt carrier, a powder obtained by supporting Rh on the Rh carrier, and an appropriate solvent (for example, ion exchanged water). The viscosity and solid content ratio in the first slurry should be adjusted as appropriate so that the slurry can easily flow into the small pores 18a in the partitions 16. Meanwhile, the second slurry contains a powder obtained by supporting Pt on the Pt carrier, a powder obtained by supporting Rh on the Rh carrier, and an appropriate solvent (for example, ion exchanged water). The viscosity and solid content ratio in the second slurry should be adjusted as appropriate so that the slurry can easily flow into the large pores 18b in the partitions 16. In order for the first slurry and the second slurry to be suitably adhered inside the partitions 16, the first slurry and the second slurry may contain a binder. It is preferable to use, for example, an alumina sol or a silica sol as the binder. Here, the supported quantity of Pt per 1 g of Pt carrier in the first slurry is smaller than the supported quantity of Pt per 1 g of Pt carrier in the second slurry. In addition, the supported quantity of Rh per 1 g of Rh carrier in the first slurry is smaller than the supported quantity of Rh per 1 g of Rh carrier in the second slurry.

When the first catalyst parts 20 and the second catalyst parts 30 are formed, the first slurry is first coated inside partitions 16. The method for coating the first slurry inside the partitions 16 is not particularly limited. For example, it is possible to immerse the partitions 16 in the first slurry for a prescribed period of time, and then remove the partitions from the slurry. In addition, after the partitions 16 are removed from the first slurry, excess first slurry is to be removed by suction (or by blowing a gas). Here, the first slurry readily flows into the small pores 18a having relatively small pore diameters as a result of intake caused by capillary action. Therefore, by immersing the partitions 16 in the first slurry, the first slurry preferentially flows into the small pores 18a in the partitions 16. In addition, the first slurry is unlikely flow out from the small pores 18a having relatively small pore diameters due to capillary action. Therefore, after the partitions 16 are removed from the first slurry, the first slurry filled in the large pores 18b is preferentially removed by suction (or by blowing a gas). That is, by using the method described above, the small pores 18a are readily filled with the first slurry and the large pores 18b are unlikely to be filled with the first slurry. Therefore, the first slurry can be preferentially filled in the small pores 18a. Once the first slurry is filled in the small pores 18a, the partitions should be dried and fired. In this way, the first catalyst parts 20 are formed on wall surfaces of the small pores 18a.

Next, the second slurry is suction coated inside the partitions 16. The method for coating the second slurry inside the partitions 16 is not particularly limited. For example, it is possible to immerse the partitions 16 in the second slurry for a prescribed period of time, and then remove the partitions 16 from the slurry. The viscosity and solid content ratio in the second slurry should be adjusted as appropriate so that the slurry can easily flow into the large pores 18b in the partitions 16. In addition, the small pores 18a in the partitions 16 have already been coated with the first catalyst parts 20. Therefore, by immersing the partitions 16 in the second slurry, the second slurry preferentially flows into the large pores 18b in the partitions 16. Once the second slurry is filled in the large pores 18b in this way, the partitions should be dried and fired. In this way, the second catalyst parts 30 are formed on wall surfaces of the large pores 18b. Therefore, different catalyst parts 20 and 30 can be formed in the small pores 18a and the large pores 18b.

As shown in FIG. 3, the exhaust gas flows into the particulate filter 100 from an entry-side cell 12 in the substrate 10. The exhaust gas flowing in from the entry-side cell 12 passes through the porous partition 16 and reaches an exit-side cell 14. In FIG. 3, the route taken by the exhaust gas flowing in from the entry-side cell 12, passing through the partition 16, and reaching the exit-side cell 14 is shown by the arrows. In this case, because the partition 16 has a porous structure, particulate matter (PM) is trapped by the surface of the partition 16 and in pores inside the partition 16 as the exhaust gas passes through the partition 16. In addition, because the first catalyst parts 20 and the second catalyst parts 30 are provided inside the partition 16, as shown in FIG. 4, harmful components in the exhaust gas are eliminated as the exhaust gas passes through the inside of the partition 16. Here, because the exhaust gas remains for a long period of time in the first catalyst parts 20 formed in the small pores 18a, the exhaust gas is efficiently purified even if the quantity of noble metal is small. In addition, because the exhaust gas passes smoothly in the second catalyst parts 30 formed in the large pores 18b, the exhaust gas is rapidly purified without causing an increase in pressure losses. Exhaust gas that passes through the partition 16 and reaches the exit-side cell 14 is discharged to outside the filter 100 from the opening on the exhaust gas outlet side.

Second Embodiment

Figure 5:
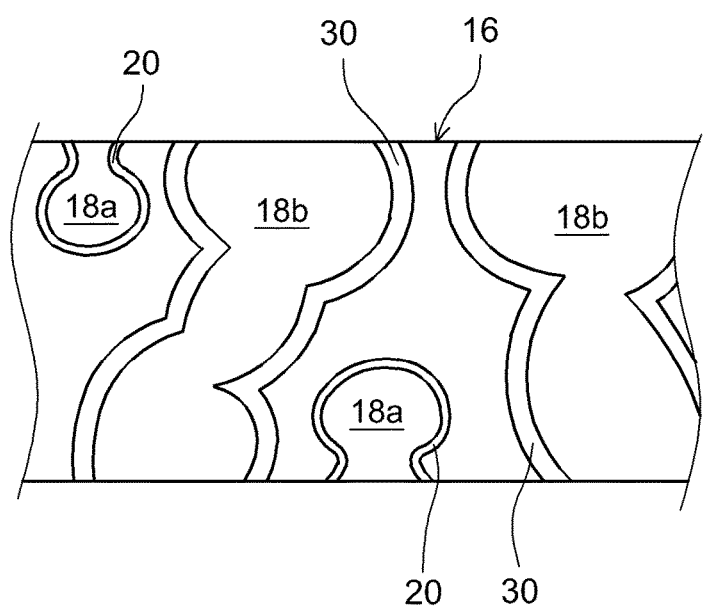
FIG. 5 is a cross-sectional view that schematically illustrates a cross section of a filter of an exhaust gas purification device according to one embodiment.

FIG. 5 is a schematic view that illustrates a cross section of the partition 16 according to a second embodiment. In this embodiment, the supported quantity of noble metal per 1 g of carrier in the first catalyst parts 20 is equivalent to the supported quantity of noble metal per 1 g of carrier in the second catalyst parts 30, and the formed quantity (coated quantity) of the first catalyst parts 20 is smaller than the formed quantity (coated quantity) of the second catalyst parts 30 per 1 liter of substrate volume. That is, the formed quantity of the first catalyst parts 20 is smaller than the formed quantity of the second catalyst parts 30 per 1 liter of substrate volume while the supported quantity of noble metal per 1 g of carrier in the first catalyst parts 20 is equivalent to the supported quantity of noble metal per 1 g of carrier in the second catalyst parts 30.

The formed quantity of first catalyst parts 20 should be smaller than the formed quantity of second catalyst parts 30 per 1 liter of substrate volume. For example, the ratio (C1/C2) of the formed quantity C1 of first catalyst parts 20 to the formed quantity C2 of second catalyst parts 30 per 1 liter of substrate volume should be approximately 0.7 or lower, preferably 0.6 or lower, and particularly preferably 0.5 or lower (for example, 0.45 or lower).

In the exhaust gas purification device disclosed here, the formed quantity of first catalyst parts 20 formed in small pores 18a (as well as the noble metal content), in which catalytic activity is high even if the quantity of noble metal is small, is smaller than the formed quantity of second catalyst parts 30 formed in large pores 18b (as well as the noble metal content). By providing a suitable difference in noble metal content between the small pores 18a (first catalyst parts 20) and large pores 18b (second catalyst parts 30) and appropriately adjusting the catalytic activity in both catalyst parts in this way, it is possible to reduce the usage quantity of noble metals in the filter as a whole and effectively improve exhaust gas purification performance. Therefore, according to the present constitution, it is possible to provide a high performance exhaust gas purification device which exhibits excellent purification performance at low cost.

In the exhaust gas purification device disclosed here, the formed quantity (coated quantity) ratio (C1/C2) preferably satisfies the formula (C1/C2)≤0.7, more preferably satisfies the formula (C1/C2)≤0.6, and particularly preferably satisfies the formula (C1/C2)≤0.5. Meanwhile, if the formed quantity ratio (C1/C2) is lower than 0.2, the catalytic activity of the first catalyst parts 20 becomes too low, meaning that the desired purification performance may not be achieved. From the perspective of improving purification performance, it is preferable to satisfy the formula 0.2≤(C1/C2) (and especially 0.3≤(C1/C2)). For example, first catalyst parts 20 and second catalyst parts 30 in which the formed quantity ratio (C1/C2) is 0.2 to 0.5 (and especially 0.3 to 0.45) are suitable from the perspective of achieving both an increase in purification performance and a reduction in costs.

More specifically, the formed quantity of first catalyst parts 20 should be approximately 10 g to 50 g, and preferably 20 g to 40 g, per 1 liter of substrate volume. In addition, the formed quantity of second catalyst parts 30 should be approximately 50 g to 100 g, and preferably 60 g to 80 g, per 1 liter of substrate volume. If the formed quantities of first catalyst parts 20 and second catalyst parts 30 fall within such ranges, exhaust gas purification performance can be further improved.

Explanations will now be given of experimental examples relating to the present invention, but it is not intended that the present invention is limited to these experimental examples.

Working Example 1

In Working Example 1, a filter catalyst was produced so that the supported quantity of noble metal per 1 g of carrier in the first catalyst parts 20 was smaller than the supported quantity of noble metal per 1 g of carrier in the second catalyst parts 30, while the formed quantity of the first catalyst parts 20 was equivalent to the formed quantity of the second catalyst parts 30 per 1 liter of substrate volume. Here, Pt and Rh were used as noble metals. In addition, a ceria-zirconia composite oxide was used as the Pt carrier on which Pt is supported, and La-stabilized alumina was used as the Rh carrier on which Rh is supported.

Specifically, a Pt-supported ceria-zirconia composite oxide carrier powder was produced by preparing a ceria-zirconia composite oxide as the Pt carrier, immersing this Pt carrier in a solution of Pt dinitrodiamine as a noble metal catalyst solution, and then evaporating the solution to dryness. The supported quantity of Pt was approximately 0.004 g per 1 g of the Pt carrier (ceria-zirconia composite oxide). In addition, a Rh-supported Rh/alumina carrier powder was produced by preparing La-stabilized alumina as a Rh carrier, immersing this Rh carrier in a rhodium nitrate solution as a noble metal catalyst solution, and then evaporating the solution to dryness. The supported quantity of Rh was approximately 0.0011 g per 1 g of the Rh carrier (alumina). A first catalyst part-forming slurry was prepared by mixing the Pt/ceria-zirconia composite oxide carrier powder, the Rh/alumina carrier powder, an alumina binder and ion exchanged water. The viscosity and solid content ratio in the first catalyst part-forming slurry were adjusted as appropriate so that the slurry could easily flow into the small pores 18a in the partitions. Next, a cordierite wall flow structure substrate (diameter 103 mm, overall length 105 mm) was immersed in the first catalyst part-forming slurry, excess slurry was removed by blowing, and the substrate was then dried and fired so as to form first catalyst parts 20 inside small pores 18a in the partitions 16. The formed quantity (coated quantity) of first catalyst parts 20 was 50 g per 1 liter of substrate.

Next, a second catalyst part-forming slurry was prepared using a similar procedure to that used for the first catalyst part-forming slurry. However, the supported quantity of Pt per 1 g of the Pt carrier (ceria-zirconia composite oxide) was approximately 0.02 g (5 times the quantity in the first catalyst parts), and the supported quantity of Rh per 1 g of the Rh carrier (alumina) was approximately 0.0055 g (5 times the quantity in the first catalyst parts). In addition, the viscosity and solid content ratio in the second catalyst part-forming slurry were adjusted as appropriate so that the slurry could easily flow into the large pores 18b in the partitions. Next, the wall flow structure substrate was immersed in the second catalyst part-forming slurry, excess slurry was removed by blowing, and the substrate was then dried and fired so as to form second catalyst parts 30 inside large pores 18b in the partitions 16. The formed quantity (coated quantity) of second catalyst parts 30 was 50 g per 1 liter of substrate. A filter catalyst in which first catalyst parts 20 and second catalyst parts 30 were formed inside partitions was prepared in this way. Moreover, per 1 liter of substrate volume, the content of Pt was 0.6 g/L, the content of Rh in the filter catalyst as a whole was 0.15 g/L, the content of the Pt carrier was 50 g/L, the content of the Rh carrier was 45 g/L, and the content of the binder was 5 g/L in the filter catalyst as a whole.

Comparative Example 1

For purposes of comparison, a catalyst part-forming slurry according to Comparative Example 1 was prepared using the same procedure as that for the first catalyst part-forming slurry. However, the supported quantity of Pt per 1 g of the Pt carrier (ceria-zirconia composite oxide) was approximately 0.012 g, and the supported quantity of Rh per 1 g of the Rh carrier (alumina) was approximately 0.033 g. In addition, the viscosity and solid content ratio in this slurry were adjusted so that the slurry could easily flow into both the small pores 18a and large pores 18b in the partitions. Next, the wall flow structure substrate was immersed in the slurry, excess slurry was removed by blowing, and the substrate was then dried and fired so as to form catalyst parts inside small pores 18a and large pores 18b in the partitions 16. The formed quantity (coated quantity) of catalyst parts was 100 g per 1 liter of substrate. Moreover, per 1 liter of substrate volume, the content values for Pt, Rh, Pt carrier, Rh carrier and binder in the filter catalyst as a whole were the same as in Working Example 1.

Figure 6:
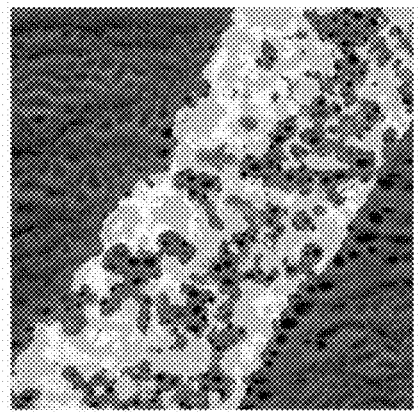
FIG. 6 is a SEM image of a cross section of the filter catalyst according to Working Example 1.
Figure 7:
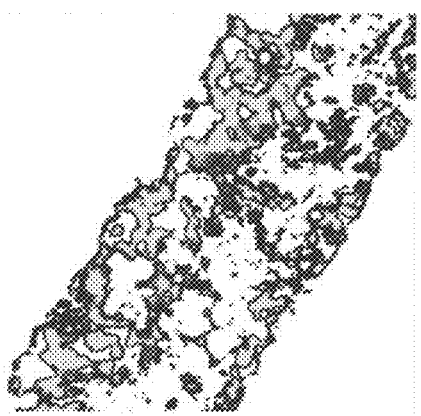
FIG. 7 is an EPMA image that illustrates the state of dispersion of Ce in the filter catalyst according to Working Example 1.
Figure 9:
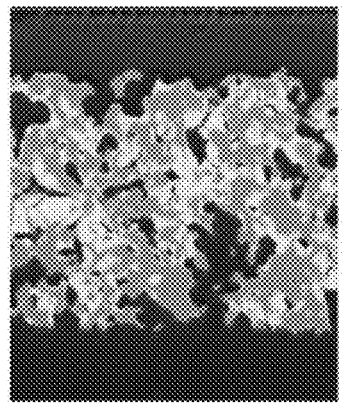
FIG. 9 is a SEM image of a cross section of the filter catalyst according to Comparative Example 1.
Figure 10:
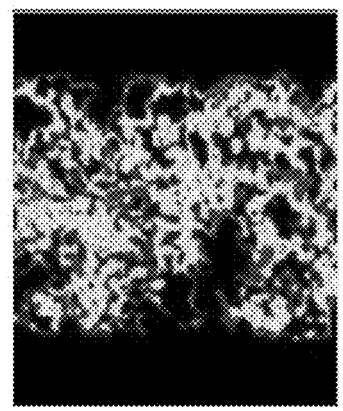
FIG. 10 is an EPMA image that illustrates the state of dispersion of Ce in the filter catalyst according to Comparative Example 1.
Figure 11:
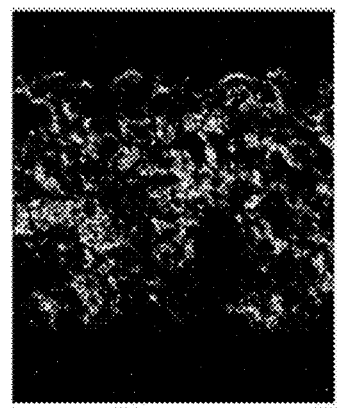
FIG. 11 is an EPMA image that illustrates the state of dispersion of Pt in the filter catalyst according to Comparative Example 1.

Cross-sectional SEM images were obtained from the filter catalysts obtained in Working Example 1 and Comparative Example 1. The results for Working Example 1 are shown in FIG. 6, and the results for Comparative Example 1 are shown in FIG. 9. In addition, the state of dispersion of Ce (as well as the Pt carrier) was observed using an electron probe microanalyzer (EPMA). The results for Working Example 1 are shown in FIG. 7, and the results for Comparative Example 1 are shown in FIG. 10. Furthermore, the state of dispersion of Pt was observed using an EPMA. The results for Working Example 1 are shown in FIG. 8, and the results for Comparative Example 1 are shown in FIG. 11.

Figure 8:
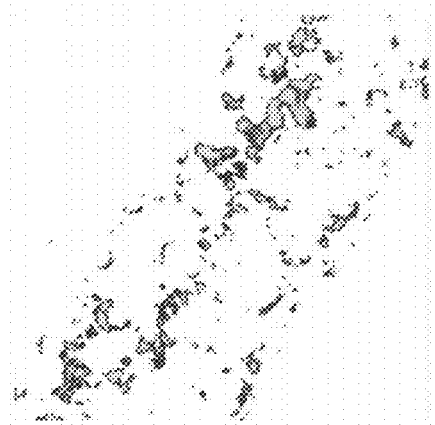
FIG. 8 is an EPMA image that illustrates the state of dispersion of Pt in the filter catalyst according to Working Example 1.

From a comparison of mapping of Ce and Pt using an EPMA, it was confirmed that in the filter catalyst of Working Example 1, sites having high a Pt concentration and sites having a low Pt concentration were both present in pores having a high Ce concentration (pores in which a large quantity of Pt carrier was present), as shown in FIGS. 6 to 8. In addition, sites having a high Pt concentration were formed mainly in large pores 18b in the partition, and sites having a low Pt concentration were formed mainly in small pores 18a in the partition. Meanwhile, as shown in FIGS. 9 to 11, it was confirmed that in the filter catalyst of Comparative Example 1, Pt was supported uniformly at the same concentration in all pores having a high Ce concentration (that is, pores in which a large quantity of Pt carrier was present), and Pt was supported at the same concentration, with no difference between small pores 18a and large pores 18b.

Figure 12:
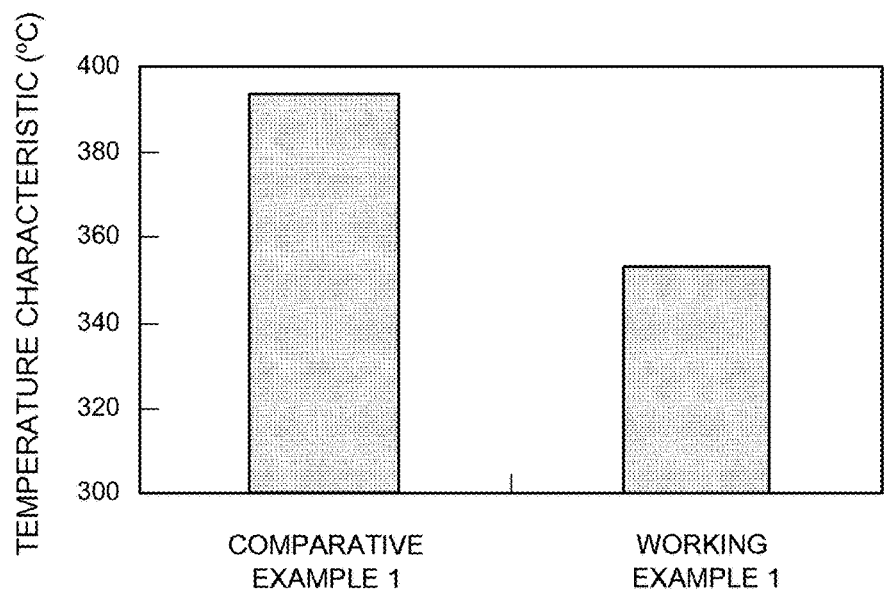
FIG. 12 is a graph showing the 50% purification temperatures of Working Example 1 and Comparative Example 1.

The HC gas elimination rate was continuously measured at 100° C. to 600° C. (at a rate of temperature increase of 20° C./min) for the filter catalysts of Working Example 1 and Comparative Example 1, and the 50% purification temperature (a temperature characteristic) was measured. This 50% purification temperature is the temperature of gas at the catalyst inlet at which the HC gas elimination rate reaches 50%. The results are shown in FIG. 12. FIG. 12 is a graph showing the 50% purification temperatures (temperature characteristics) of Working Example 1 and Comparative Example 1.

As shown in FIG. 12, the 50% purification temperature for HC was higher than 390° C. for the filter catalyst of Comparative Example 1. However, the filter catalyst of Working Example 1 had a lower 50% purification temperature for HC and exhibited superior catalytic activity, despite using the same quantity of noble metal in the filter as a whole as Comparative Example 1. It is surmised that exhaust gas purification performance could be effectively improved by providing a suitable difference in the supported quantity of noble metal per 1 g of carrier (as well as the noble metal content) between the small pores (first catalyst parts) and large pores (second catalyst parts) in the partitions and appropriately adjusting the catalytic activity in both catalyst parts in Working Example 1. From these results, it was confirmed that catalyst performance can be improved by making the content of noble metals in small pores in partitions lower than the content of noble metals in large pores in partitions.

Working Example 2

In Working Example 2, a filter catalyst was prepared so that the formed quantity of the first catalyst parts 20 was smaller than the formed quantity of the second catalyst parts 30 while the supported quantity of noble metal per 1 g of carrier in the first catalyst parts 20 was similar to the supported quantity of noble metal per 1 g of carrier in the second catalyst parts 30.

Specifically, a Pt-supported ceria-zirconia composite oxide carrier powder was produced by preparing a ceria-zirconia composite oxide as the Pt carrier, immersing this Pt carrier in a solution of Pt dinitrodiamine as a noble metal catalyst solution, and then evaporating the solution to dryness. The supported quantity of Pt was approximately 0.012 g per 1 g of the Pt carrier (ceria-zirconia composite oxide). In addition, a Rh-supported Rh/alumina carrier powder was produced by preparing La-stabilized alumina as a Rh carrier, immersing this Rh carrier in a rhodium nitrate solution as a noble metal catalyst solution, and then evaporating the solution to dryness. The supported quantity of Rh was approximately 0.033 g per 1 g of the Rh carrier (alumina). A first catalyst part-forming slurry was prepared by mixing the Pt/ceria-zirconia composite oxide carrier powder, the Rh/alumina carrier powder, an alumina binder and ion exchanged water. The viscosity and solid content ratio in the first catalyst part-forming slurry were adjusted as appropriate so that the slurry could easily flow into the small pores 18a in the partitions. Next, a cordierite wall flow structure substrate (diameter 103 mm, overall length 105 mm) was immersed in the first catalyst part-forming slurry, excess slurry was removed by blowing, and the substrate was then dried and fired so as to form first catalyst parts 20 inside small pores 18a in the partitions 16. The formed quantity (coated quantity) of first catalyst parts 20 was 30 g per 1 liter of substrate.

Next, a second catalyst part-forming slurry was prepared using a similar procedure to that used for the first catalyst part-forming slurry. However, the viscosity and solid content ratio in the second catalyst part-forming slurry were adjusted as appropriate so that the slurry could easily flow into the large pores 18b in the partitions. Next, a cordierite wall flow structure substrate (diameter 103 mm, overall length 105 mm) was immersed in the second catalyst part-forming slurry, excess slurry was removed by blowing, and the substrate was then dried and fired so as to form second catalyst parts 30 inside large pores 18b in the partitions 16. The formed quantity (coated quantity) of second catalyst parts 30 was 70 g per 1 liter of substrate. Moreover, per 1 liter of substrate volume, the content of Pt was 0.6 g/L, the content of Rh in the filter catalyst as a whole was 0.15 g/L, the content of the Pt carrier was 50 g/L, the content of the Rh carrier was 45 g/L, and the content of the binder was 5 g/L in the filter catalyst as a whole.

Comparative Example 2

For purposes of comparison, a catalyst part-forming slurry according to Comparative Example 2 was prepared using the same procedure as that for the first catalyst part-forming slurry. However, the viscosity and solid content ratio in this slurry were adjusted so that the slurry could easily flow into both the small pores 18a and large pores 18b in the partitions. Next, a cordierite wall flow structure substrate (diameter 103 mm, overall length 105 mm) was immersed in the slurry, excess slurry was removed by blowing, and the substrate was then dried and fired so as to form catalyst parts inside small pores 18a and large pores 18b in the partitions 16. The formed quantity (coated quantity) of catalyst parts was 100 g per 1 liter of substrate. Moreover, per 1 liter of substrate volume, the content values for Pt, Rh, Pt carrier, Rh carrier and binder in the filter catalyst as a whole were the same as in Working Example 2.

Figure 13:
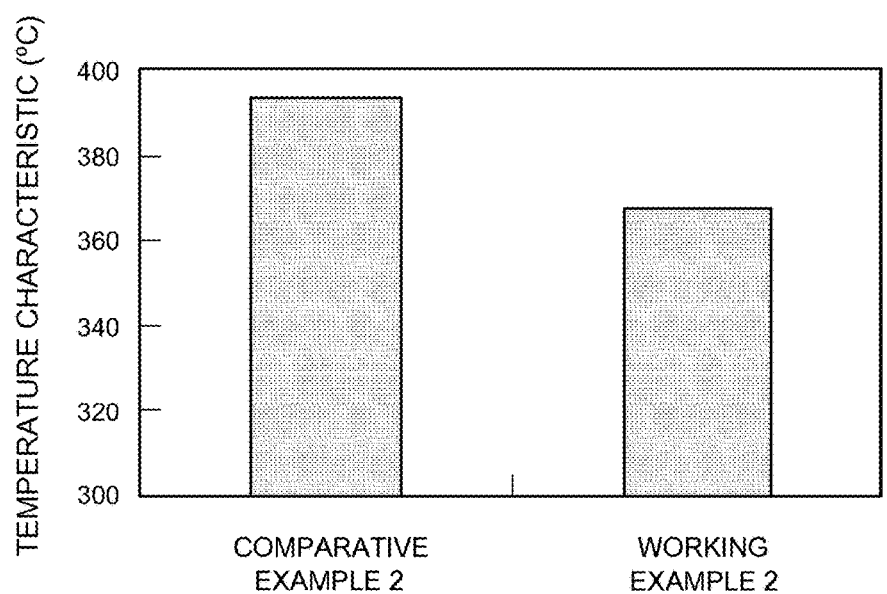
FIG. 13 is a graph showing the 50% purification temperatures of Working Example 2 and Comparative Example 2.

The HC gas elimination rate was continuously measured at 100° C. to 600° C. (at a rate of temperature increase of 20° C./min) for the filter catalysts of Working Example 2 and Comparative Example 2, and the 50% purification temperature (a temperature characteristic) was measured. The results are shown in FIG. 13. FIG. 13 is a graph showing the 50% purification temperatures (temperature characteristics) of Working Example 2 and Comparative Example 2.

As shown in FIG. 13, the 50% purification temperature for HC was higher than 390° C. for the filter catalyst of Comparative Example 2. However, the filter catalyst of Working Example 2 had a lower 50% purification temperature for HC and exhibited superior catalytic activity, despite using the same quantity of noble metal in the filter as a whole as Comparative Example 2. It is surmised that exhaust gas purification performance could be effectively improved by providing a suitable difference in the formed quantity (as well as the noble metal content) between the small pores (first catalyst parts) and large pores (second catalyst parts) in the partitions and appropriately adjusting the catalytic activity in both catalyst parts in Working Example 2. From these results, it was confirmed that catalyst performance can be improved by making the formed quantity of first catalyst parts in small pores in partitions smaller than the formed quantity of second catalyst parts in large pores in partitions.

Various modifications have been given above for the particulate filter 100 and the exhaust gas purification device 1 provided with the particulate filter 100, but the structure of the particulate filter 100 and the structure of the exhaust gas purification device 1 are not limited to any of the embodiments shown above.

The shapes and structures of the components and parts of the exhaust gas purification device 1 may be altered. In the example shown in FIG. 1, the catalyst part is provided on the upstream side of the filter part, but the catalyst part may be omitted. This exhaust gas purification device 1 is particularly suitable as a device for eliminating harmful components in exhaust gases having relatively high temperatures, such as exhaust gases from gasoline engines. However, the exhaust gas purification device 1 according to the present invention is not limited to applications for eliminating harmful components in exhaust gases from gasoline engines, and can also be used in a variety of applications for eliminating harmful components in exhaust gases emitted from other types of engine (for example, diesel engines).

INDUSTRIAL APPLICABILITY

According to the present invention, it is possible to provide an exhaust gas purification device capable of improving exhaust gas purification performance.

The invention claimed is:
1. An exhaust gas purification device which is disposed in an exhaust pathway of an internal combustion engine and purifies an exhaust gas emitted by the internal combustion engine, the exhaust gas purification device comprising:
   a wall flow structure substrate that has an entry-side cell in which only an exhaust gas inlet side end is open, an exit-side cell which is adjacent to the entry-side cell and in which only an exhaust gas outlet side end is open, and a porous partition which divides the entry-side cell from the exit-side cell;
   first catalyst parts which are formed in small pores having a relatively small pore diameter among internal pores in the partition; and
   second catalyst parts which are formed in large pores having a relatively large pore diameter among the internal pores in the partition,
   wherein
   the first catalyst parts and the second catalyst parts each contain a carrier and at least one type of noble metal from among Pt, Pd and Rh supported on the carrier, and
   the noble metal content in the first catalyst parts is smaller than the noble metal content in the second catalyst parts per 1 liter of substrate volume, and
   the supported quantity of the noble metal per 1 g of carrier in the first catalyst parts is smaller than the supported quantity of the noble metal per 1 g of carrier in the second catalyst parts.
2. The exhaust gas purification device according to claim 1, wherein the average pore diameter of small pores in which the first catalyst parts are formed is not more than 10 µm, and the average pore diameter of large pores in which the second catalyst parts are formed is more than 10 µm and not more than 100 µm.
3. The exhaust gas purification device according to claim 1, wherein the first catalyst parts and second catalyst parts both contain Pt and Rh as the noble metals.
4. The exhaust gas purification device according to claim 1, wherein the internal combustion engine is a gasoline engine.

* * * * *